No. 893,889. PATENTED JULY 21, 1908.
L. ZAMBONI.
PULLEY OR WHEEL.
APPLICATION FILED MAR. 6, 1905.
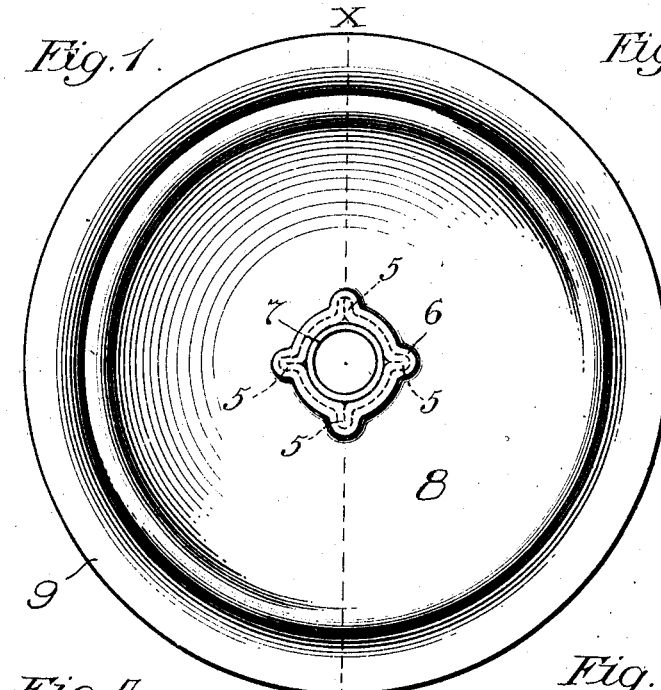
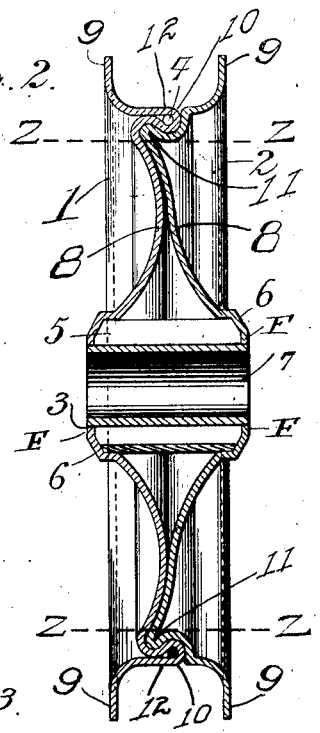
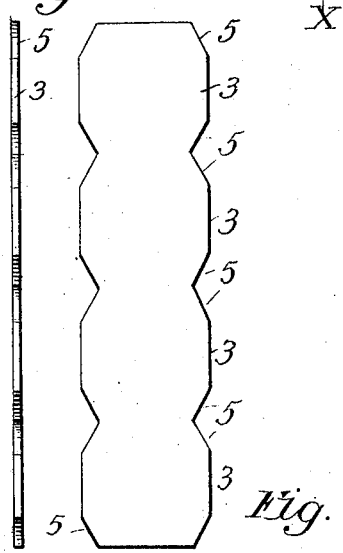
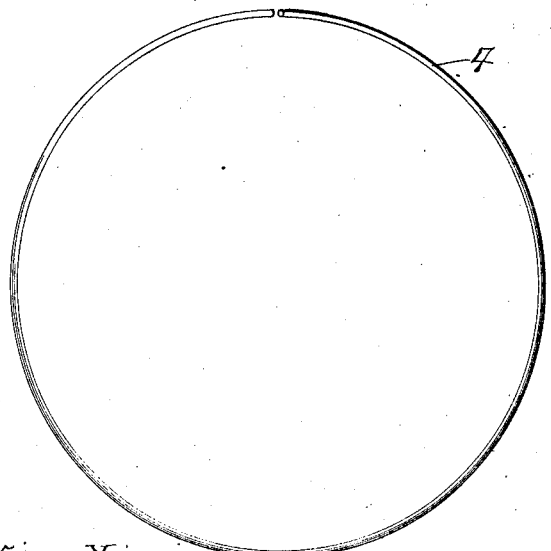
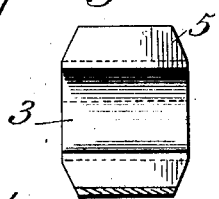
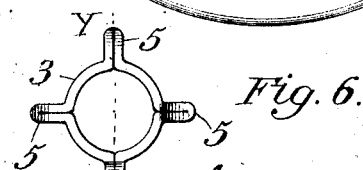
Witnesses
Edward G. Rowland.
M. F. Keating
Inventor
Lawrence Zamboni
By his Attorney
Charles J. Kintner

UNITED STATES PATENT OFFICE.

LAWRENCE ZAMBONI, OF PHILADELPHIA, PENNSYLVANIA.

PULLEY OR WHEEL.

No. 893,889.  Specification of Letters Patent.  Patented July 21, 1908.

Application filed March 6, 1905. Serial No. 248,523.

*To all whom it may concern:*

Be it known that I, LAWRENCE ZAMBONI, a citizen of the United States, residing in Philadelphia, county of Philadelphia, and State of Pennsylvania, have made a new and useful Invention in Pulleys or Wheels, of which the following is a specification.

My invention is directed particularly to improvements in pulleys or wheels of the pressed metal type; that is to say, such as are made by the compression of cold steel in dies; for instance, as is disclosed in a prior patent granted to me on the 9th day of February, 1904, and numbered 751,707, and it has for its objects—First, to devise a pulley or wheel of this type which shall possess great strength, be simple of construction, and may be quickly and cheaply made. Second, to construct such a pulley of two interlocking halves, each of which is formed by overlapping the metal of its respective half upon itself, the outer overlapping portion of one of said interlocking parts being adapted to directly sustain the belt or rope to be used with the pulley, the arrangement of the parts being such that when interlocked the action of the belt or rope tends to hold said interlocking parts more firmly together. Third, to provide such a pulley with a duplex hub sustaining web which is formed simultaneously with the formation of the interlocking parts and with the rope bearing flanges.

In the pulley or wheel disclosed in my before-mentioned patent the two halves thereof are held together by a locking device located in the grooves in the web of the pulley and at a considerable distance from the outer belt or rope bearing rim thereof, and the locking device, in the nature of a metal strip, with the holding parts are then bent upward with their free ends against the under surface of the belt bearing rim.

The before-mentioned pulley or wheel is without any form of hub and the web thereof, to which the hub is to be attached, is of such construction that if a hub be supplied it must necessarily be so constructed as to materially complicate the entire structure. A pulley or wheel as thus constructed is also open to the objection that because of the fact that the locking device or ring is secured firmly in the web and at some distance from the grooved or belt bearing rim, there is a tendency for the flanges constituting the groove to separate when great stress is put upon the pulley by the driving rope.

The present improvement overcomes all of these objections, in that I locate the interlocking parts absolutely in the outer belt or rope bearing rim of the pulley and secure the interlocking device at that point in such manner as to obtain the best practical results, afterwards brazing the parts together so as to produce a pulley which is practically as strong as a cast steel pulley, the overlapping interlocking parts in double folds constituting a belt or rope bearing rim immediately beneath the rope bearing surface which gives to the pulley great strength.

For a full and clear understanding of my invention, such as will enable others skilled in the art to construct and use the same, reference is had to the accompanying drawings which show all of the details of a full sized pulley, and in which, Figure 1 is a side elevational view thereof; Fig. 2 being a sectional view taken through Fig. 1 on the line X—X illustrating the interlocking flanges of the hub in elevational view. Fig. 3 is a side elevational view of the split locking ring; Fig. 4 is an edge view; and, Fig. 5 is a plan view of the developed form of the blank from which the hub is made. Fig. 6 is an end elevational view of the completed hub; and Fig. 7 is a sectional view thereof taken on the line Y—Y Fig. 6.

Referring now to the drawings in detail in all of which like numerals indicate like parts wherever used, 1, 2 indicate the two halves of the pulley or wheel made from circular disks, preferably of relatively thin sheet steel, and pressed in forming dies in a manner well understood by those skilled in the art and in such way as to form the flanges or faces 9, 9, of the groove for the belt or rope and a duplex curvilinear web part 8, 8, as shown, there being formed during the act of such compression of each half two interlocking parts indicated respectively by the numerals 10 and 11, these interlocking parts being formed by the folding of the metal upon itself in each instance, the outer overlapping fold 12 of the part 10 constituting a portion of the rope bearing surface of the pulley and the arrangement such, as will be seen on examination of Fig. 2, that the stress put upon the rope will tend to hold the interlocking parts more firmly together. At the same time that these interlocking parts and rope bearing flanges or faces are formed two curvilinear supporting parts 6, 6, provided with internal radially disposed grooves, four in number, for sustaining the hub, are also formed, as shown in Figs. 1 and 2.

4 is a split locking ring made preferably of steel wire.

Referring now to Figs. 4, 5 and 6 the hub is constructed of a blank of sheet metal and cut or stamped in the manner shown in Figs. 4 and 5, so that when rolled up or formed in the manner illustrated in Fig. 6 there is a plurality of radially disposed arms 5, 5, 5, having inclined end-faces, 3 representing the body of the hub proper. These arms 5, 5, are preferably formed as shown in Fig. 7 and are adapted to fit, by reason of their inclined ends when the two halves of the pulley are put together, into the curvilinear supporting parts 6, 6, in each of said halves and, as before stated, at the inner portion of the double or duplex web 8, 8.

These parts are constructed and assembled as follows:—The two halves 1 and 2 of the pulley are formed in dies giving to them the substantial conformation shown and then the locking ring 4 is sprung into position between the folds of the outer locking part 10. The hub, formed as before described, is then inserted in position with the ends of the arms 5, 5, in the curvilinear supporting grooves 6, 6, and all of the parts sprung into locked position, as shown in Fig. 2. Afterwards the two halves may be brazed together in the locking groove and at the ends of the hub and its support, thereby constituting a substantially integral pulley or wheel. If desired, an accurately turned bushing 7 (see Fig. 1) may be inserted within the hub 3 and secured thereto by brazing, soldering, keying, or in any preferred way. All of that portion of the pulley outside of the dotted lines Z—Z Z—Z Fig. 2 I denominate as the rope bearing rim proper of the pulley, and all of that portion between said lines Z—Z Z—Z and the curvilinear supporting parts 6, 6, and indicated by the numerals 8, 8, I denominate as the web of the pulley.

I believe it is broadly new with me to provide a pulley of the pressed metal type with two interlocking parts composed of metal folded in each instance upon itself and so arranged that when the parts are locked together the outer fold of one of said interlocking parts is directly exposed to and adapted to be placed in frictional contact with the driving rope or belt and in such way that the stress thereof tends to more firmly lock the parts together and to avoid any possibility of a splitting action when great stress is put upon the driving or driven rope, and my claims are generic as to this feature.

Having thus described my invention what I claim and desire to secure by Letters Patent of the United States is—

1. A pulley constructed of two halves of metal provided each with an interlocking part folded upon itself, the outer fold of one of said interlocking parts being adapted to rest directly under and in contact with the driving rope or belt, the arrangement being such that the stress of said rope or belt tends to more firmly lock the parts together, substantially as described.

2. A two-part pulley having interlocking parts which overlap each other, and a split locking ring located between the folds of the outer interlocking part, the outer surface of which part is adapted to directly support the driving rope or belt, substantially as described.

3. A pulley constructed of two interlocking halves the web portion of each half being curved outward toward the center and provided with hub supporting grooves; in combination with a hub having radially disposed arms fitting in such grooves, substantially as described.

4. A pulley hub constructed of a single piece of metal bent in cylindrical form and provided with radially disposed sustaining arms having inclined end faces, substantially as described.

5. A pulley hub constructed of a single piece of metal having radially disposed arms bent back and forth, the body of the hub being longer than the outer ends of the arms, and said arms being provided with inclined end surfaces, substantially as described.

6. A pulley constructed of two sheet metal disks having a conjoint belt surface and a curvilinear duplex web provided with indented or depressed grooves; in combination with a hub made of a single piece of metal having radially disposed arms adapted to be secured in said grooves, substantially as described.

In testimony whereof I have signed my name to this specification in the presence of two subscribing witnesses.

LAWRENCE ZAMBONI.

Witnesses:
C. J. KINTNER,
M. F. KEATING.